Dec. 29, 1936.       H. L. BOWERS       2,065,962
BRINE RECOVERY APPARATUS FOR WATER SOFTENERS
Filed Oct. 17, 1934       6 Sheets-Sheet 1

Inventor
Herbert L. Bowers,

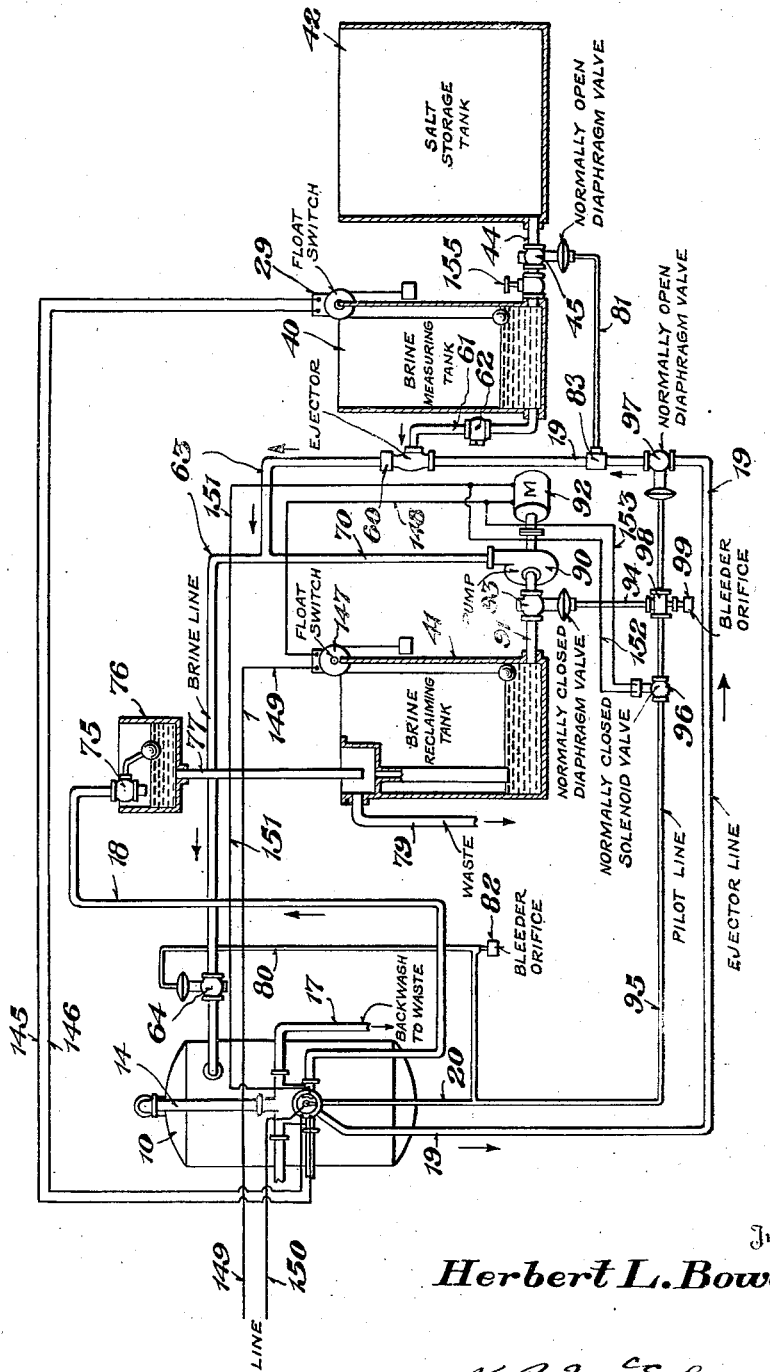

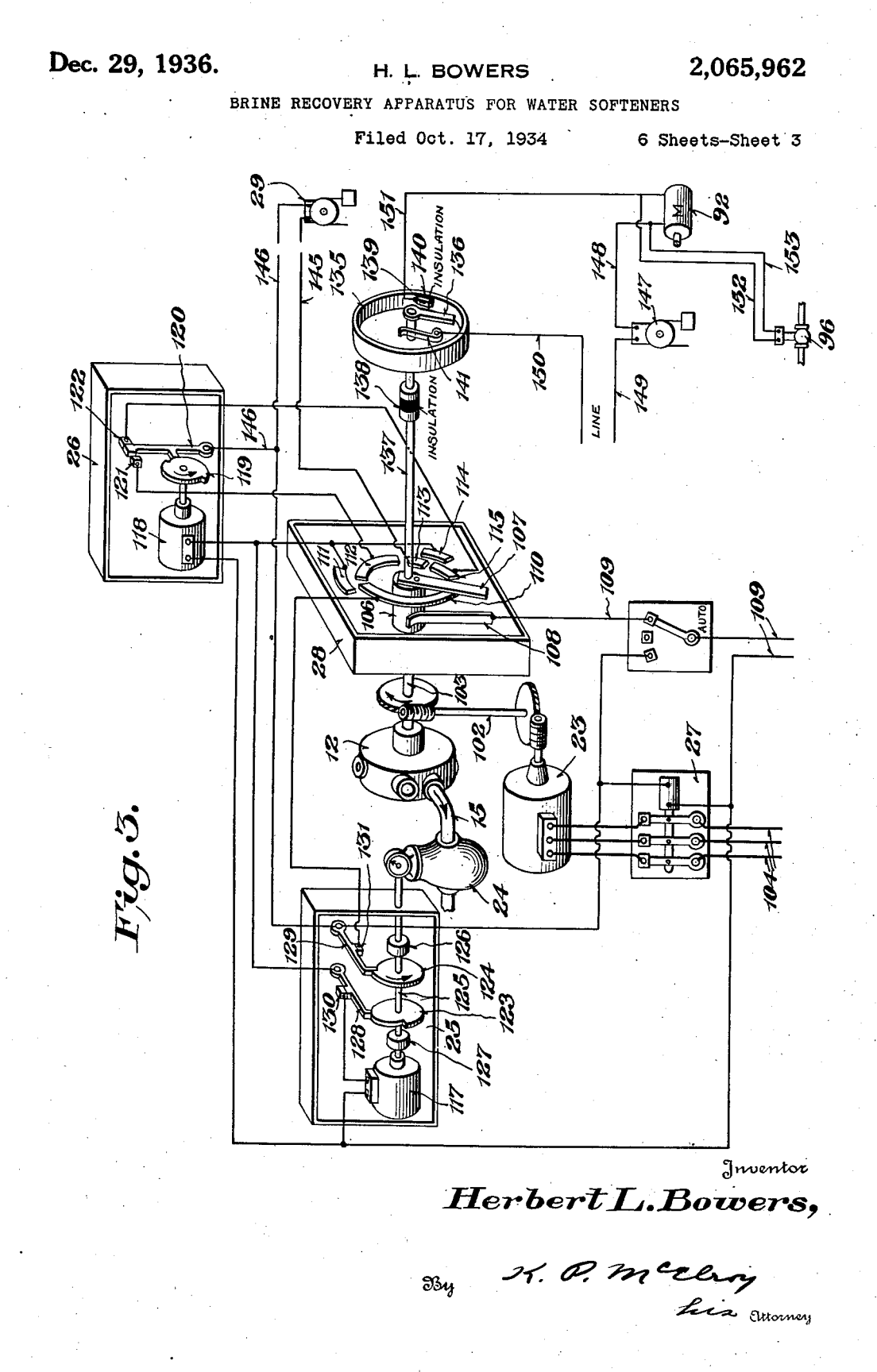

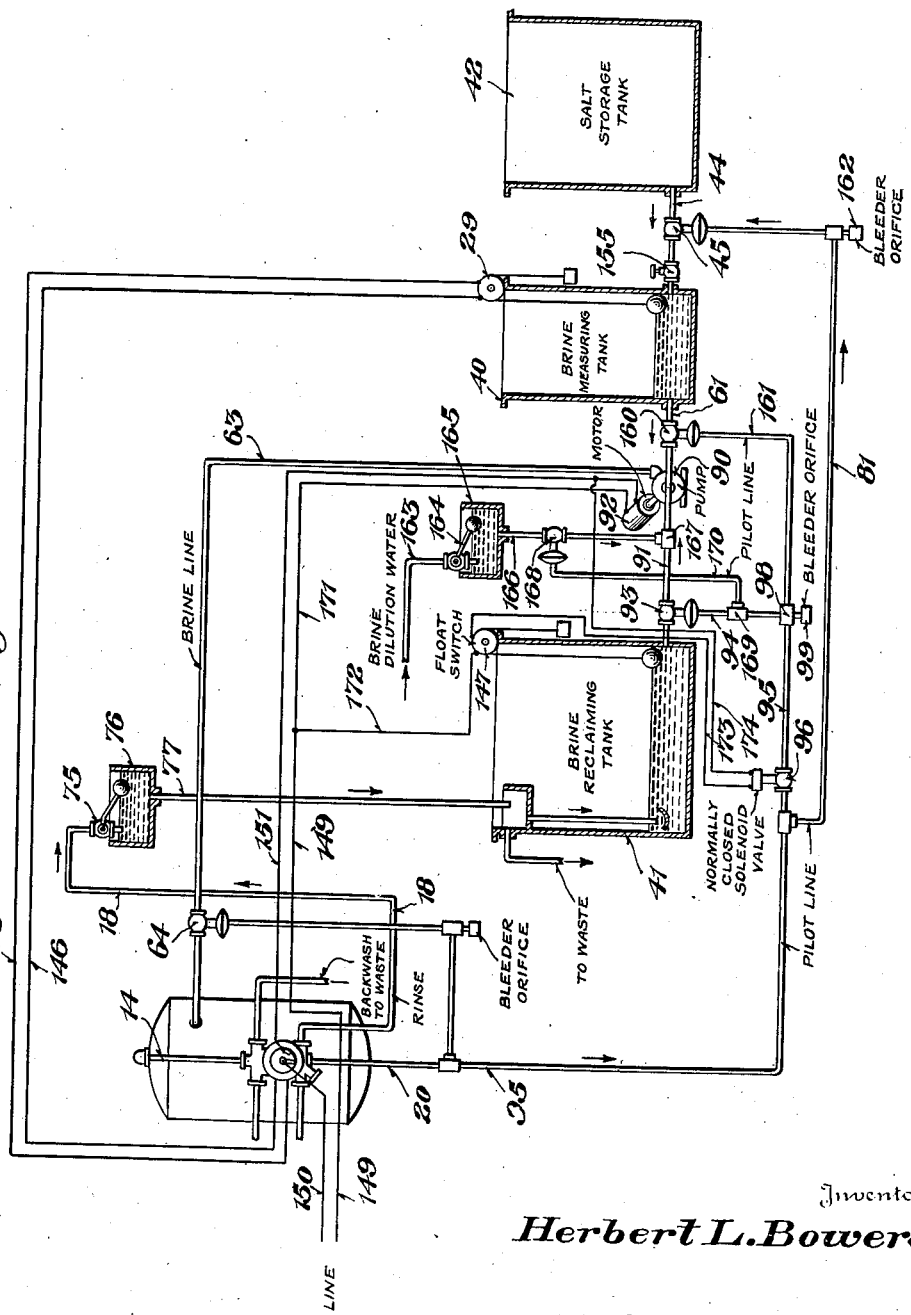

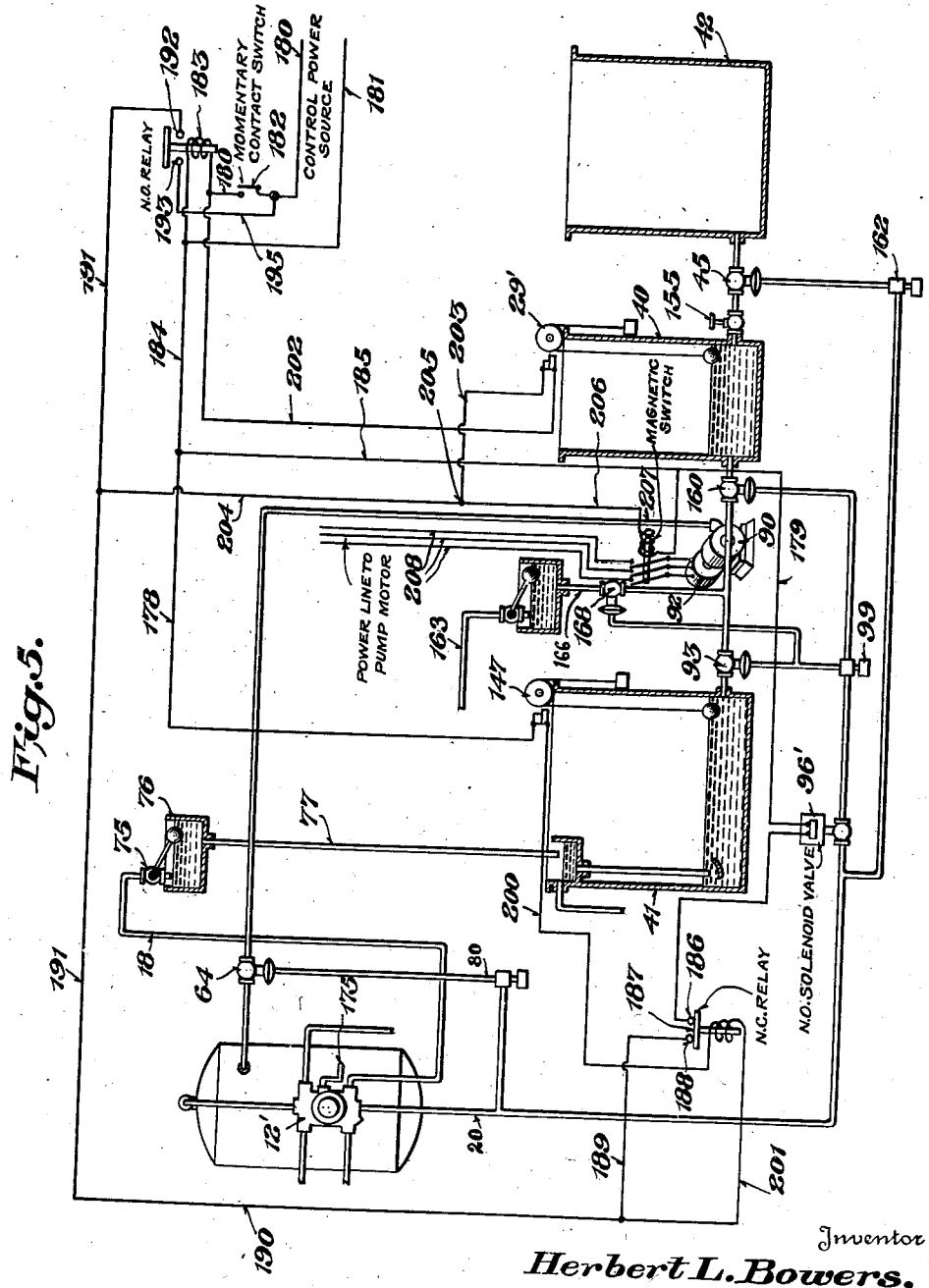

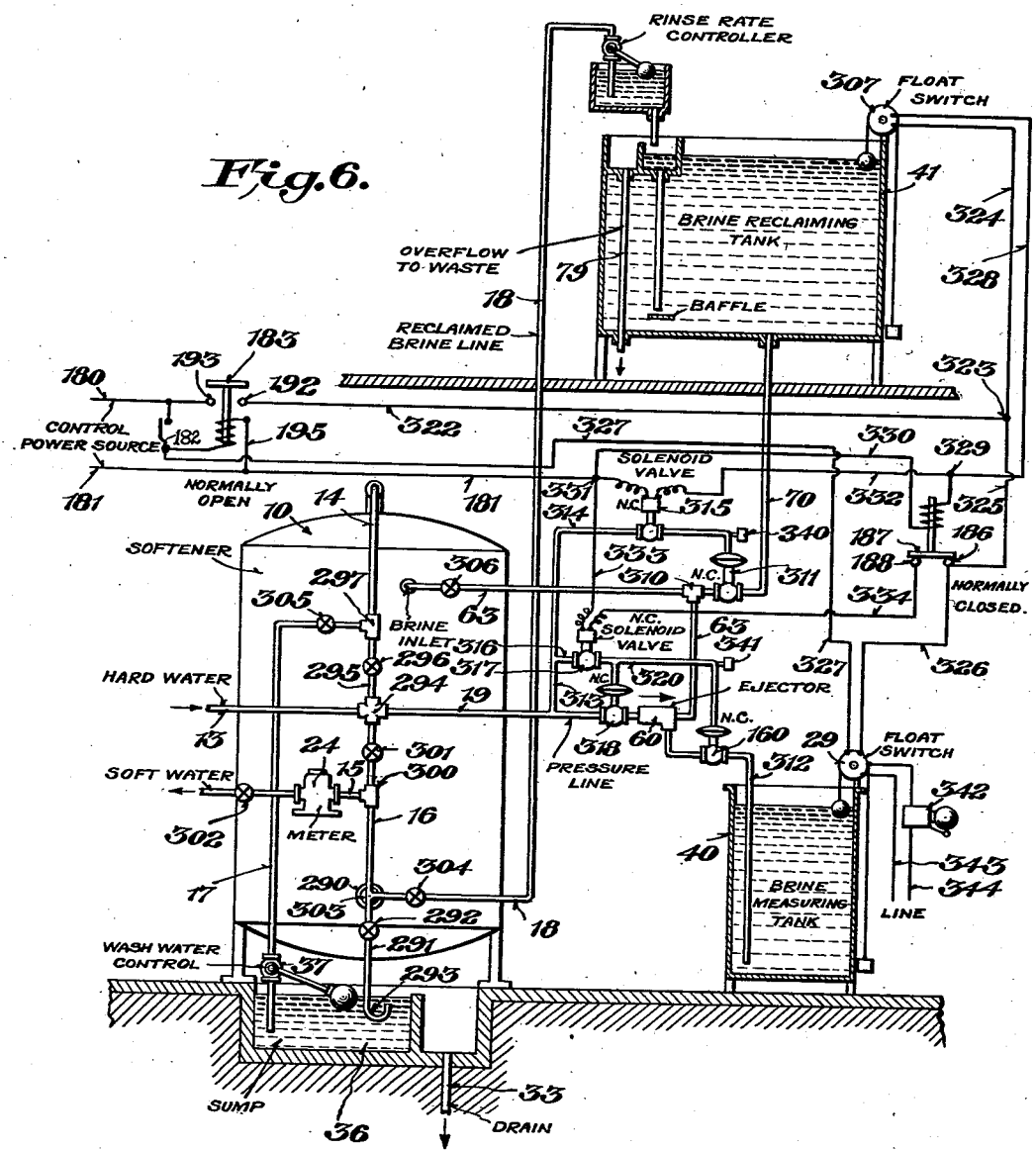

Patented Dec. 29, 1936

2,065,962

UNITED STATES PATENT OFFICE 2,065,962

BRINE RECOVERY APPARATUS FOR WATER SOFTENERS

Herbert L. Bowers, Long Island City, N. Y., assignor to The Permutit Company (1934), Wilmington, Del., a corporation of Delaware Application October 17, 1934, Serial No. 748,709

11 Claims. (Cl. 210—24)

This invention relates to brine recovery apparatus for water softeners; and it comprises in a water softening apparatus having a container for zeolites, conduits for flows of hard and soft water and regenerating solutions, valve means for controlling the flows and a source of fresh brine, improved automatic regenerating means wherein a portion of the brine used in regenerating is reclaimed for reuse in a subsequent regenerating cycle, said means comprising a reclaiming container adapted to receive a portion of brine displaced from the zeolite container during rinsing, a conduit connection between the zeolite container and the brine reclaiming container, means for diverting to the brine reclaiming container brine displaced from the zeolite container during the rinsing flow and means adapted when the zeolite container is put in the brining phase in a subsequent regenerating cycle to cause reclaimed brine to flow from the reclaiming container into the softener and thence to waste, means adapted upon actuation to cause fresh brine to flow into the zeolite container from the source thereof, and means adapted to actuate said last named means and controlled by the level of brine in the brine reclaiming container; all as more fully hereinafter set forth and as claimed.

In water softening by means of base exchange materials (zeolites) such as glauconite or synthetic zeolites, water to be softened is passed through a body of such material in granular form. During the passage calcium and magnesium in the water are replaced by sodium from the zeolites. After a certain quantity of water has passed, the amount depending on the hardness of the water and the nature of the zeolites, it becomes necessary to revive or regenerate the zeolites. This is done by flowing through the bed a more or less dilute solution of common salt. The salt displaces calcium and magnesium from the zeolites as soluble chlorids, while the zeolites take up sodium in exchange therefor. When regeneration is complete, the solution, which comprises in general calcium and magnesium chlorids together with more or less salt, is flushed out. The zeolite is rinsed and is then ready for another softening cycle.

The amount of salt required in regeneration is considerable in certain cases; for example in large plants such as municipal plants or in softeners dealing with very hard waters. It is desirable to effect economies in its use; and it is the purpose of the present invention to provide improved automatically controlled apparatus for effecting such economies.

In the simplest regenerating method brine is merely passed through the zeolites or allowed to stand in contact therewith until regeneration is complete; or, more usually in practice, until regeneration is as complete as can be practically realized. The effluent fluid, containing calcium chlorid, some magnesium chlorid and more or less excess salt, is passed to waste. In this method there is an inherent waste of salt. In passing the salt through the spent zeolites, the first fraction of the effluent is practically a solution of calcium and magnesium chlorids. As more and more salt is passed through, however, the zeolites gradually becoming regenerated, the effluent contains a greater and greater proportion of salt (sodium chlorid) and less and less calcium and magnesium salts. At the end of regeneration, substantially all calcium and magnesium being removed from the zeolites, the effluent brine is a fairly pure salt solution; the brine passes through the zeolites unchanged. The later fractions of the effluent are capable of being used in the first stages of a subsequent regeneration.

In Duggan Patent No. 1,510,469 a method is disclosed and claimed of recovering and utilizing partially exhausted regenerating solutions wherein the effluent solution is divided into a number of portions. The first portion, which contains largely calcium and magnesium chlorids, is discarded; a second portion is saved for use in the next cycle, sometimes after chemical treatment; and a third portion, containing largely salt, is saved for use in the next brining phase direct. The relative proportions, and the number, of the separated portions are adjusted according to circumstances. With this method, salt consumption may be cut down considerably. The present invention provides improved and automatic means for carrying out a modification of this method.

In equipping a softener for brine delivery, at least one extra tank is needed, to hold reclaimed brine; and also appropriate conduits and valves for controlling the brining operations. In the ordinary type of softener utilizing a number of individual hand-operated valves on the conduits, installation of a brine recovery system adds to the complexity and gives opportunity for error on the part of the operator. This increased complexity of operation has worked against a more general practice of brine recovery. In batteries of softener units, which often have master valve means, it is desirable to have the several operations automatic throughout.

According to the present invention improved automatic brine recovery systems are provided, adapted to be applied to any softener. The systems are adapted to function either entirely automatically, as in the case of softeners having automatically controlled master valves, or to go through their operations automatically upon manual starting; this latter modification being particularly adapted for manually operated softeners having either a master valve or a plurality of individual valves. The new system makes possible all the advantages of brine recovery while adding little or nothing to the complexity of operation as far as the operator is concerned. Brine recovery, with its attendant economies, is carried out automatically.

The invention, which will be described in conjunction with various types of softening apparatus, in all cases having a source of brine such as a brine tank, comprises in general a tank for holding a portion of regenerating solution displaced from the softener tank during rinsing, a conduit between these tanks, valve controlled means adapted to divert brine displaced from the softener during the rinsing flow to the reclaiming tank; and adapted, when the softener is put into the brining phase in a subsequent cycle to pass reclaimed brine from the reclaiming tank to the softener and thence to waste, means adapted upon actuation to cause fresh brine to flow into the softener, said means coming into play after the reclaiming tank has been emptied; and means controlled by the level of brine in the reclaiming tank for actuating the brine-flowing means. Operation of the reclaiming system is automatic, being sometimes by interlocking hydraulic means, sometimes by electrical means, and in some cases by combination of the two.

In the accompanying drawings I have shown, more or less diagrammatically, several forms of specific embodiments of apparatus within my invention. In the showings, Fig. 1 is a view, partly in elevation and partly in vertical section, of an automatic softener combined with an automatic brine recovery system employing gravity feed;

Fig. 2 is a similar view of a modified softener and brine recovery system, in which the reclaimed brine is fed by pump;

Fig. 3 is a diagrammatic showing of the electrical control circuit in the softener of Fig. 2, showing how the electrical brine reclaiming control of the present invention is connected therein;

Fig. 4 is a view, partly in elevation and partly in vertical section, of apparatus similar to that of Fig. 2 but in which the fresh brine also is fed by pump;

Fig. 5 is a similar view of a modified system in which the softener is manually operated and the brine recovery system is automatic; and Fig. 6 is a similar view of a modified system in which the softener has a plurality of individual control valves and in which the reclaimed brine is fed by gravity.

Figure 1:
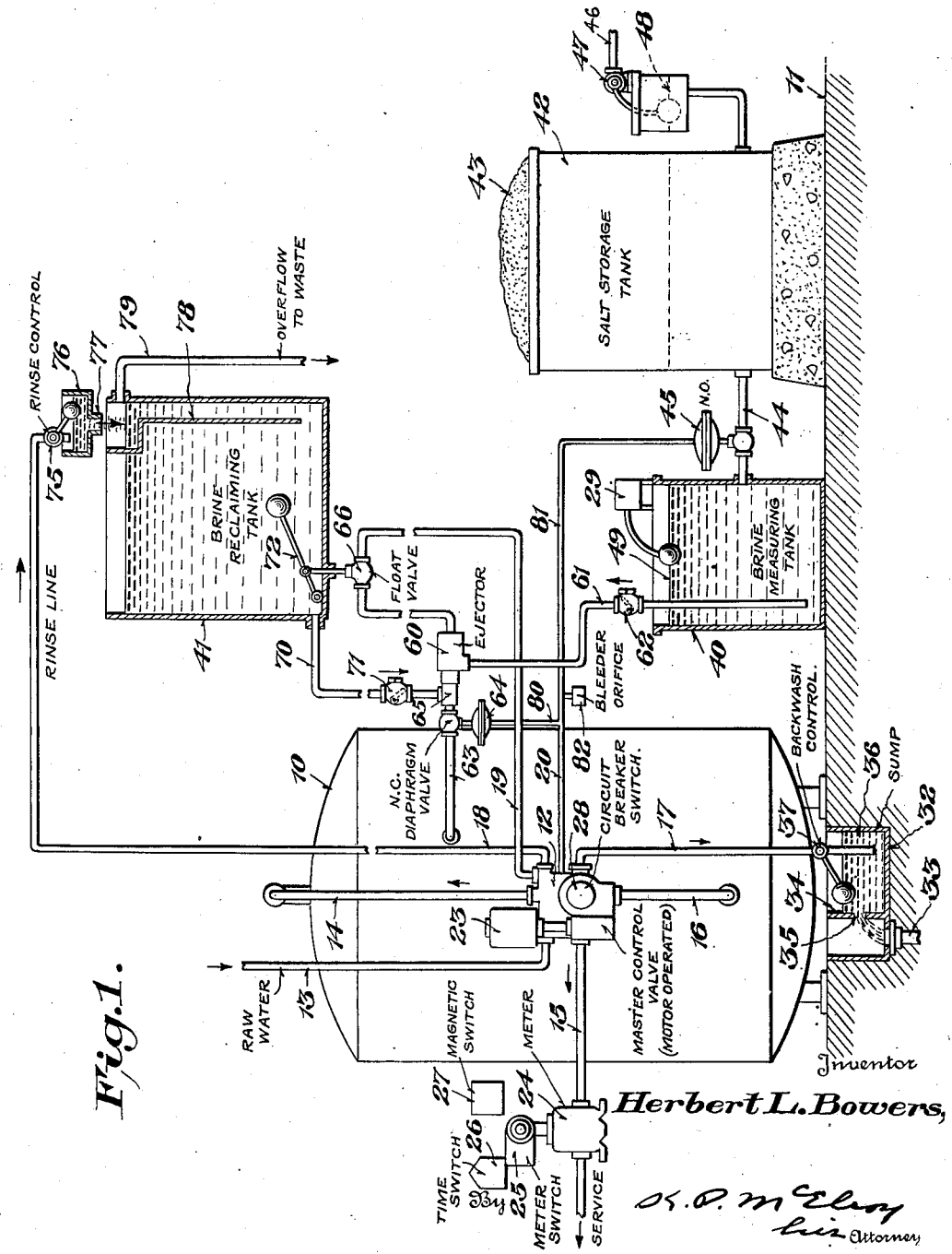

In the showings, in which like reference characters indicate like parts throughout, the recovery systems in each case are shown applied to a softener comprising a tank 10 adapted to contain a body of zeolites and shown as mounted on a base or floor 11. Fig. 1 shows a system completely automatic throughout. I have shown the brine recovery system as applied to a particular type of automatically controlled softener, this softener being featured in a copending application of another and forming no part of the present invention. The brine recovery system is completely automatic and is hydraulically controlled throughout. The automatically controlled softener comprises an electrically operated master control valve designated as a whole by 12. As shown, the master control valve is provided with eight different conduit connections for different flows to and from the softener. Raw water to be softened enters the valve through conduit 13; conduit 14 delivers to the top of the softener; conduit 15 is the outlet for softened water; conduit 16 connects the valve with the bottom of the softener; conduit 17 is the backwash outlet; conduit 18 is the rinse line leading to the brine reclaiming tank; conduit 19 leads to the brine ejector and conduit 20 is the pilot line, as described below. All these conduit connections are controlled by the valve; which is of the multi-port type having a ported rotor and stator and being adapted to control the stages of softening, backwashing, rinsing and, indirectly, brining upon being automatically rotated to the several operating positions. The valve is rotated by a motor 23. The automatic control system for the softener proper is adapted upon actuation to turn the valve at appropriate intervals to carry out the various regenerating phases. The control system comprises a water meter 24 in soft water line 15, a meter switch 25 run by the meter, a time switch 26, a magnetic switch 27, a circuit breaker switch 28 in operative connection with the valve and a float switch 29 on the brine measuring tank. The electrical connections for the motor and switches are similar to those shown in Fig. 3.

The backwash line 17 is fitted with a control adapted to regulate the backwash flow. This control comprises a sump 32 in base 11 having an outlet 33 to waste and a weir 34 having an orifice 35 and adapted to establish and maintain a pool 36 of backwash water, as shown. A float valve 37 is mounted in the backwash line as shown. The control is adapted to allow a strong backwash flow, but if the flow tends to become too violent the pool level rises, partially closing valve 37.

The brining system comprises two tanks; a tank 40 for fresh brine and a tank 41 for reclaimed brine. The fresh brine system advantageously comprises in addition a salt storage tank 42 holding a charge 43 of salt and in communication with the brine measuring tank through a conduit 44 controlled by normally open diaphragm valve 45. Water for making up brine is delivered to the salt storage tank 42 through a conduit 46 having a float valve control 47 adapted to maintain a liquid level 48 corresponding to the desired liquid level 49 in the brine measuring tank.

The fresh brine feeding system comprises an ejector 60 in communication with the brine measuring tank through a conduit 61 provided with a check valve 62 adapted to allow brine to be drawn from the measuring tank but to prevent back flow through conduit 61. The ejector is adapted to deliver to the softener tank through a conduit 63 provided with a normally closed diaphragm valve 64 and with a T-connection 65. In one stage of operations water under pressure is supplied to the ejector through conduit 19 which is controlled by a float valve 66.

In the specific embodiment of Fig. 1 the brine reclaiming tank 41 is, as shown, mounted above the softener and is adapted to supply liquid to the softener under a gravity head. The tank is adapted to deliver into brine inlet conduit 63 by means of a conduit connection 70 joining conduit 63 at the T 65. A check valve 71 adapted to allow downward flow only is provided in conduit 70, as shown. Float valve 66 comprises a pivoted float 72 in the reclaiming tank. The valve is adapted to remain closed while there is reclaimed brine in tank 41, and to be opened when the float sinks, that is, when the reclaiming tank is empty. As shown, rinse line 18 is adapted to deliver into the reclaiming tank through a rinse control comprising a flat valve 75 and a float box 76 having an outlet 77, cooperating with the float valve to regulate the rinse flow. A baffle device 78 is provided in the reclaiming tank for preventing entering rinse water from mingling with fluid already in the tank. An overflow connection 79 leads from the top of the tank inside the baffle to waste.

The control pressure line for diaphragm valves 64 and 45 comprises two branches 80 and 81 connected to pilot line 20. A bleeder orifice 82 is provided in the pilot line. The bleeder orifice is a fitting having a small opening and adapted to allow water to leak out and thus to release pressure from the pilot valves when pressure in the pilot line is cut off.

The system of Fig. 1 is most clearly understood by considering its operation. In operation, at the beginning of the regenerating step reclaimed brine passes downwardly through the zeolite body, and when all the reclaimed brine has passed through, fresh brine is passed into the softening tank and to waste; the first fraction of the regenerating brine being practically exhausted in regenerating the zeolites. Then a rinse flow is passed through the softener, first the brine and then the rinsing water passing to the brine reclaiming tank. Considering the operation in detail, assume that the customary backwashing operation has just been completed and the master control valve rotated by the motor 23 from the backwash position to the regenerating position. In this position the valve makes connections from the bottom of the tank by way of conduit 16 to the backwash outlet 17 and to the rinse line 18. At the same time it admits (raw) water under pressure from conduit 13 to conduit 19 and to pilot line 20 which opens diaphragm valve 64 in the conduit connections 70 and 63 between the valve reclaiming tank and the softener and closes diaphragm valve 45. Water does not at this time flow through conduit 19, this conduit being closed at this time, as described below. Reclaimed brine then flows by gravity into the softener through conduits 70 and 63 and out to waste through backwash outlet 17. Flow of reclaimed brine into brine measuring tank 40 is prevented by check valve 62. When all the reclaimed brine has flowed from the reclaiming tank, float valve 66 opens. This admits a flow of water through conduit 19, ejector 60 and conduit 63, and the ejector draws brine from the measuring tank through conduit 61 and injects it in diluted form into the softener. The amount of fresh brine drawn from the measuring tank is regulated by the automatic control system including the float switch 29 on the brine measuring tank. The amount of fresh brine drawn is, of course, considerably less than that required in systems not utilizing brine recovery. Measuring tank 40 may be made smaller than is usually necessary in ordinary softener installations. The purpose of valve 45, which is closed during brining and open at all other times, is to prevent brine from flowing into the measuring tank during the time brine is being drawn from the tank. If desired, valve 45 and its control line 81 may be omitted, and a fitting having a restricted orifice substituted therefor in conduit 44. Such an arrangement serves to prevent any appreciable replenishment of brine in tank 40 during the relatively short time that brine is being drawn therefrom. When the correct amount of fresh brine has been drawn, the control valve is automatically rotated to the rinse position, closing the backwash port and opening the connection from conduit 13 to conduit 14, whereupon a flow of fresh rinsing water is admitted to the top of the softener. At the same time the valve causes pressure to be released on pilot line 20. Liquid escapes from the pilot line through bleed orifice 82, releasing pressure in the line and thus allowing valve 64 to close and valve 45 to open. The rinse port of the valve remains open in this position. Fresh water then passes downwardly through the zeolite body and out through rinse conduit 18 leading to the brine reclaiming tank. Rinse control 75, 76 regulates the rinse to a rather gentle flow; considerably less violent than the backwashing flow. Baffle 78 prevents incoming reclaimed brine from mixing with brine already in the tank. The concentration of the reclaimed brine delivered to the tank gradually becomes less. When the tank is full, the remainder of the rinse fluid overflows to waste through conduit 79. Since baffle 78 prevents mixing, the last fractions of the rinse water, passed to waste, are composed of water that enters the brine reclaiming tank during the last stage of the rinsing and contain little salt. The fraction of the rinse water reclaimed is determined by the capacity of tank 41. Ordinarily it is convenient to have the capacity of the reclaimed brine tank of the same order as the net liquid capacity of the softener tank; but the relative capacity may be selected according to particular requirements.

It will be noted that the rinse line is arranged to deliver water at a point above the softener. In regenerating position liquids discharged from the softener cannot flow by gravity through this line but instead pass out through the backwash outlet, as is desired.

When the rinsing stage is completed, the duration of this step being controlled by the automatic valve operating system, the control valve is automatically rotated to the softening position. In the softening position valve connections to the rinse line are closed, and are opened to the raw water conduit 13 and service conduit 15.

Fig. 2 shows a modified embodiment which finds particular utility in installations where it is not convenient to mount the brine reclaiming tank in an elevated position. In this modification the reclaimed brine is moved by a pump, and all the several tanks of the system are, or may be, on the same level. This system is in general similar to that of Fig. 1, but comprises as additional elements a pump 90 communicating with the brine reclaiming tank through a conduit 91 and operable by a motor 92. A normally closed diaphragm valve 93 in conduit 91 controls the inlet to the pump. The valve is operable by pressure in branch pilot line 94 connected through pilot line 95 to pilot line 20. Line 95 is controlled by a normally closed solenoid valve 96, as shown. A normally open diaphragm valve 97 is mounted in conduit 19, as shown, and is connected to pilot line 95 at a T 98 provided with a bleed orifice 99. Valve 97 takes the place of float valve 66 in the modification of Fig. 1, and is provided for the same purpose. In Fig. 2, diaphragm valve 45 between the salt dissolving tank and the brine measuring tank is connected through pilot line 81 and T 83 with conduit 19, as shown. The brine ejector 60 is coupled in conduit 19 is in Fig. 1 and is adapted to deliver, through conduit 63, to the top of the softener. Branch conduit 70 connects the conduit 63 with the outlet of pump 90, as shown.

This modification is electrically controlled, the electrical brine recovery controls being connected into the control circuit for the softener valve. While the softener valve control circuit per se forms no part of the present invention it is shown (Fig. 3) and described in sufficient detail to explain how the present system is applied to this particular form of electrically controlled softener. As shown, the multiport valve 12 is driven by motor 23 through speed reducing gearing 102 and valve shaft 103, the motor being supplied with current through power wires 104 controlled by normally open magnetic switch 27. Valve shaft 103 extends into circuit breaker switch 28 and carries a hub extension 106 with a rotary contact brush 107 carried thereon. Contact is made to the brush by means of a wiper brush 108 bearing on the hub, and connected to one of wires 109 of a control power source, as shown. The brush 107 is adapted to make contact during rotation with one or more of six arcuate contact elements 110, 111, 112, 113, 114 and 115 in the circuit breaker switch.

Timing switch 26 comprises a timing motor 118 driving a cam 119 adapted to move a switch arm 120 alternately between two contact points 121 and 122.

The water meter 24 is adapted to actuate the meter switch 25, which comprises two cams 123 and 124 mounted on a shaft 125 coupled to the meter through a one-way drive slipping clutch 126 and coupled to a resetting motor 117 through a similar clutch 127. The cams are adapted to open and close a pair of switch arms 128 and 129 cooperating with contact points 130 and 131 respectively. The meter is adapted to rotate the cams from a zero or original position in one direction up to a certain point, and the resetting motor is adapted to continue the rotation in the same direction back to zero position. When the meter is rotating the cams, clutch 127 slips. When the motor is rotating them, clutch 126 slips. The automatic valve control system of the softening apparatus in Fig. 1 is similar to the system so far described.

According to my invention a rotary switch 135 is provided, having a rotary arm 136 driven from valve shaft hub 106 by means of a shaft 137, an insulating coupling 138 being interposed in shaft 137 as shown. An arcuate contact element 139 is mounted in the switch, as shown, by a piece of insulating material 140. The arm 136 and element 139 are arranged in similar angular positions to brush 107 and arcuate contact element 113 as shown. Electrical contact with arm 136 is made by a spring brush 141. Arm 136 makes contact with element 139 in one angular position of the arm, corresponding to brining position; as described post.

Float switch 29, which is normally open and is adapted to close when brine tank 40 empties, is connected to arcuate contact element 113 and to timing switch arm 120, as shown, by wires 145 and 146. A float switch 147 is provided in the brine reclaiming tank as shown, the switch being closed so long as liquid remains in the tank and opening when the tank is empty. One side of switch 147 is connected with pump motor 92 through a wire 148; the other side is connected to one wire 149 of a pair of power wires. The other power wire 150 is connected to rotary switch arm 136 by brush 141. A wire 151 leads from contact element 139 to motor 92, as shown. Solenoid valve 96 is connected in parallel with the motor 92 through wires 152 and 153.

Considering the operation of this system, assume that the usual backwashing operation has just been completed and the master control valve has just been automatically rotated from the backwash position to the regenerating position. In this position the valve uncovers ports to the backwash outlet line 17, to ejector line 19, to the rinse line 18, and to pilot line 20. Brush 107 rests on contact element 113. The rotary switch 135 is closed, arm 136 contacting with contact member 139. As in the case of the embodiment of Fig. 1, the rinse line is arranged so as to deliver liquid to the brine reclaiming tank at a level above the softener (the rinse flow control is located above the softener, as shown) hence the discharge from the softener cannot flow by gravity through this line and instead passes out through the backwash outlet.

The rotary switch 135 being now closed, and float switch 147 being closed (the reclaiming tank is full at the beginning of the regenerating operation), a circuit is established from power wires 149 and 150 through the pump motor and solenoid valve 96, starting the motor and opening the solenoid valve. The course of this circuit is from power wire 150 through arm 136 of switch 135, element 139, wire 151, motor 92, wire 148, float switch 147 and the other power wire 149. Solenoid valve 96 receives current through wires 152 and 153. Pressure being admitted to pilot line 20, pressure is admitted to branch line 80, causing valve 64 in brine line 63 to open. The opening of solenoid valve 96 allows pressure to be transmitted through pilot line 95 to valves 93 and 97. Valve 93 in the pump line 91 is thus opened and valve 97 is closed, shutting off ejector line 19.

Reclaimed brine is now delivered to the softener by pump 90, through conduits 91, 70 and 63 and open valve 64. Reclaimed brine is prevented from entering the brine measuring tank by check valve 62, as in the embodiment shown in Fig. 1; and is prevented from entering conduit 19 by closed valve 97.

When the brine reclaiming tank is emptied, float switch 147 automatically opens, breaking the circuit to the pump motor 92 and the solenoid valve 96. The motor stops and the solenoid valve closes, shutting off fluid pressure to valves 93 and 97. Thereupon pressure is released through bleeder 99, and valve 93 closes and valve 97 opens. Fresh water now flows through conduit 19 and the ejector 60, drawing fresh brine from the measuring tank and delivering it to the softener through conduit 63 and open valve 64. Since valve 93 is closed, no fresh brine can enter the reclaiming tank. Valve 45 is now also closed, being under pressure through pilot line 81, hence make-up brine cannot flow into the measuring tank. As in the embodiment shown in Fig. 1, valve 45 and pilot line 81 may be omitted and a simple restricted orifice substituted therefor; or conduit 44 may be closed manually by a valve 155 provided for such purpose.

When the required amount of brine has been drawn from the measuring tank 40, float switch 29 closes, establishing a circuit through wire 109, wiper 108, arm 107, contact element 113, wire 145, float switch 29, wire 146, and timing switch arm 120. Establishment of this circuit causes the softener valve control to turn the master valve 12 to rinse position.

In rinse position rotary switch 135 is opened. Pressure is released in pilot line 80 through bleeder orifice 82, allowing valve 64 to close. Valve 93 remains closed, valve 97 remains open, and valve 45 opens, since in the rinse position port connections to ejector line 19 are closed. Make-up brine flows into measuring tank 40 from salt storage and dissolving tank 42, refilling the measuring tank.

In the rinse position only rinse line conduit 18 and conduit 14 are open. Fresh water passes down through the zeolite body, displacing brine through the rinse flow controller into the brine reclaiming tank. Excess rinse water and dilute brine overflow to waste. When the rinsing operation is completed, the duration being determined by the automatic softener control system, the valve is automatically turned to softening position.

Fig. 4 shows an embodiment similar to that in Fig. 2, but in which both the reclaimed brine and the fresh brine are moved by pump. As shown, the inlet of pump 90 is connected to the brine measuring tank through conduit 61 and controlled by a normally open diaphragm valve 160, connected into pilot line 95 by a branch pilot line 161 at T 98. In this embodiment branch pilot line 81 to valve 45 is provided with a bleeder orifice 162. It is inadvisable to introduce strong fresh brine into the softener, since dilute brines are more effective in regenerating the zeolites. In embodiments employing an ejector for introducing the brine, dilution automatically takes place with the water used for ejecting. In the pump system of Fig. 4, on the other hand, auxiliary means are provided for diluting the brine before it is introduced into the softener. These means comprise a conduit 163 for fresh water, a flow controller comprising a float valve 164 and float box 165 for the conduit, and a conduit 166 leading from the float box to conduit 91 at a T 167. Conduit 166 is controlled by a normally open diaphragm valve 168 connected to branch pilot line 94 at a T 169 through a branch pilot line 170.

The electrical connections are somewhat different. Power wire 149 is connected through a wire 171 to motor 92 and through a wire 172 to float switch 147 which is also connected by a wire 173 to solenoid valve 96. A wire 174 connects solenoid valve 96 with wire 151, connected to motor 92. The other connections are like those in Figs. 2 and 3.

The operation of the system of Fig. 4 is quite similar to that of the system of Fig. 2, and is as follows. Assume that the master control valve has just been turned from backwashing to regenerating position. As in the embodiment of Fig. 2 solenoid valve 96 is opened, and the pump motor is started, by the rotary switch. Opening of the solenoid valve admits pressure to diaphragm valves 93, 160 and 168. Valve 93 is opened, allowing the pump to draw reclaimed brine from tank 41 and feed it into the softener through conduit 63. Valve 168 is closed, preventing dilution of the reclaimed brine with fresh water through conduit 166. Valve 160 is closed, preventing the pump from drawing fresh brine at this time.

When the brine reclaiming tank is empty, float switch 147 opens, allowing solenoid valve 96 to close. Thereupon pressure is released in branch pilot lines 95, 94, 170 and 161, through bleed orifice 99. Valve 93 closes, valve 168 opens, and valve 160 opens. The motor continues to run, feeding fresh brine into the softener. The brine is diluted by fresh water entering the pump through conduits 163 and 166. The amount of dilution can be adjusted by adjusting the flow control 164, 165.

When the required amount of brine has been drawn from the measuring tank, float switch 29 as in Fig. 2 closes a circuit in the automatic valve control system, causing the master valve to turn to rinse position. In rinse position the rotary switch 135 is opened, stopping the pump motor 92. Pressure is released on pilot line 20 and its branches, allowing valve 64 to close and valve 45 to open.

In the rinse position only rinse line conduit 18 and conduit 14 are open. Fresh water passes downwardly through the softener, displacing brine into the brine reclaiming tank, as in the systems previously described. When the rinsing operation is completed, the duration being determined by the automatic softener control system, the valve automatically is turned to softening position.

The three systems just described are particularly applicable to automatically controlled softeners, of the type employing a single master valve, or a plurality of valves on a cam shaft, or a plurality of individual valves operable by a central pilot valve or electrical control; the valve or valves in every case being opened and closed at the proper intervals by automatic timing apparatus. The systems described are completely automatic throughout; the sequence of softening and regenerating including brine recovery proceeding regularly without human regulation. Brine recovery, however, is just as much a desideratum in manually operated softener installations as in automatic plants. Some of the largest softener installations are manually operated.

The two modified systems to be described are applicable to manually operated softeners having either a single master control valve or a plurality of individual valves (a "nest" of valves) turned by an operator at appropriate intervals to direct the several phases of softening and regeneration. The brine recovery systems are, as in the embodiments disclosed in conjunction with automatic softeners, automatic; the brining and brine recovery operations are carried out automatically upon pressing a momentary contact switch.

The system shown in Fig. 5 is a modification of that shown in Fig. 4. The softener is similar to that shown in Figs. 1 to 4, except that the master valve 12' is manually operable, a crank handle 175 being provided, and the automatic control system comprising the meter switch, time switch, magnetic switch and circuit breaker switch is omitted. The rotary switch 135 is also omitted.

The float switches on the brine measuring and brine recovery tanks are retained; but float switch 29' is in this case normally closed instead of normally open. Solenoid valve 96' is in this case normally open. The tanks, conduit connections and valves are like those of Fig. 4.

A self-sustaining electrical circuit is provided for control of the brining and brine recovery systems, the circuit being energized by the operator at the beginning of the brining operation by pushing a button. As shown, the circuit comprises control power lines 180 and 181, which are connected to any convenient source of electrical energy such as A. C. or D. C. current from the mains, or other source. A momentary contact switch 182, advantageously of the push button type, controls wire 180 and hence the rest of the circuit. Wires 180 and 181 are connected to the coil of a normally open electromagnetic relay switch 183. Wire 181 is connected with one side of solenoid valve 96' through wires 184 and 185 and 179. The other side of solenoid valve 96' is connected to one contact point 186 of a second, normally closed relay 187, the other contact point 188 of this relay being connected by wires 189, 190 and 191 with one contact point 192 of relay 183. The other contact point 193 of relay 183 is connected to wire 180 by a wire 195. Wire 181 is connected through wires 184 and 178 in series with float switch 147, wire 200, the coil of relay 187, wire 201, and wire 190. Wire 180 is connected (beyond switch 182) in series with wire 202, float switch 29', wire 203, and wire 204, as at 205. Wire 204 leads to contact point 192 of relay 183. Wires 203 and 204 are also joined at 205 with wire 206 leading to the coil of a normally open magnetic switch 207 for controlling the pump motor 92. The coil of switch 207 is also connected through wire 185, with wire 184 and by wire 179 with solenoid valve 96', as shown. Magnetic switch 207 controls the supply of power to motor 92 through main power wires 208, shown as the three wires of a polyphase A. C. power circuit.

The electrical system can best be understood by considering its operation. Assume that the usual backwashing operation has just been completed. The operator then turns the master valve to regenerating position, and at the same time momentarily closes switch 182.

Closing of switch 182 energizes relay 183 through wires 180 and 181, and the relay closes. Upon releasing the switch the relay remains closed, for a circuit is established through wires 180, 195, points 193 and 192, wires 191, 204, 203, (closed) switch 29', and wire 202 through the coil of relay 183 to wire 181. The closed relay makes a circuit through wires 180 and 195, points 193 and 192, wires 191, 204 and 206, to magnetic switch 207, and through wires 185 and 184 back to the other power control wire, 181. The solenoid of magnetic switch 207 is energized, closing the switch and energizing the motor through main power wires 208. The motor can be run from the same source of current as is used for the control system, if desired; but in commercial installations it is usually convenient to provide polyphase A. C. for the rather large pump motor, and ordinary single phase A. C., or D. C., for the control system.

At the same time a circuit is established through live wire 178 (closed) float switch 147, wire 200, the coil of relay 187, wires 201, 190, 191, points 192 and 193, and wire 180. Normally-closed relay 187 is energized and opened, preventing normally open solenoid valve 96' from being energized and closed at this time.

The pump motor now being in operation, the pump feeds reclaimed brine into the softener. Solenoid valve 96' being open, pressure is applied to valves 93, 168 and 160. Valve 45 is closed. As in the embodiment of Fig. 4, valve 93 is open and valves 160 and 168 are closed. When the reclaiming tank is empty float valve 147 opens, breaking the live circuit through the coil of relay 187. This relay then closes, establishing a circuit through solenoid valve 96'; this circuit being from control power line 180, through wire 195, points 193 and 192, wires 191, 190, 189, points 188 and 186, the coil of solenoid 96', wires 179, 185, 184 and back to the other control power wire 181. Valve 96' closes, allowing pressure to be released from valves 93, 160 and 168, through bleeder 99. Valve 93 then closes and valves 160 and 168 open; valve 45 remains closed. The motor continues to run and a mixture of brine from tank 40 and dilution water from conduit 163 is pumped into the softener.

When the required amount of brine has been drawn from measuring tank 40, float switch 29' opens. This breaks the circuit through the coil of solenoid relay 183 (this circuit being from control power line 181 through wires 202, float switch 29', wires 203, 204, 191, points 192 and 193, wire 195, back to the other control power line 180), allowing relay 183 to open. Thereupon the circuit through magnetic switch 207 (this circuit being from one control power line 181 through wires 184, 185, the coil of magnetic switch 207, wires 206, 204, 191, points 192 and 193 and back through wire 195 to the other control power wire 180) is broken, allowing magnetic switch 207 to open. Thereupon the pump motor stops. The electrical circuit has now resumed its initial position and is dead, ready for operation in the next regenerating cycle on being initially actuated by the operator.

All flows to the softener are now stopped, and the softener system stands idle waiting for the operator to start the rinsing phase. This may be done immediately upon completion of the brining step or at any subsequent time before the softener is put in condition for use again.

The operator turns the master control valve 12' to the rinse position. This allows pressure to be released in pilot lines 20 and 80, and valve 45 to open exactly as described in connection with Fig. 4. Fresh water flows into the softener, displacing brine and rinse water to the reclaiming tank exactly as described in the case of the other embodiments of the invention. When the reclaiming tank is filled it overflows to waste. At the completion of the rinsing step the operator turns the valve to the softening position.

The self-sustaining circuit is readily applicable to the softener and brining organization disclosed in Fig. 2. The necessary modifications are within the ordinary ability of those skilled in the art.

In Fig. 6 I have shown a modified system applied to a simple manually controlled softener having a nest of individual valves for controlling the flows. This modification is somewhat similar to that shown in Fig. 1, with the addition of a self-sustaining circuit.

Referring to Fig. 6, the softener is shown as comprising a zeolite container 10 having a connection at the top in communication with a conduit 14, a brine inlet conduit 63 delivering near the top, an outlet 290 near the bottom in communication with conduit 16 and with a drain 291 controlled by a valve 292 and having a U-shaped bend 293 opening below the surface of the pool 36 in the sump. Hard water is delivered through a conduit 13 connecting at a cross T 294 with a conduit 295 controlled by a valve 296; conduit 19 leading to the ejector 60; and conduit 16. Conduits 14, 295 and 17 are joined at a T 297. Conduit 16 is joined with soft water delivery 15 at T 300; a valve 301 being interposed in conduit 16 between cross T 294 and T 300. A valve 302 is provided in the soft water conduit as shown. The reclaimed brine line outlet 18 is in communication with outlet 290, as at 303, and a valve 304 controls flows through outlet 18. Backwash conduit 17 has a valve 305, as shown. A valve 306 controls flows through brine inlet conduit 63. The brine reclaiming tank 41 is mounted above the softener and is similar to that shown in Fig. 1, with the addition of a float switch 307 closed except when the tank is empty. Reclaimed brine conduit 70 running from tank 41 is in communication with brine inlet conduit 63 at T 310. Conduit 70 is controlled by normally closed diaphragm valve 311. Fresh brine conduit 312 leads from tank 40 to the ejector 60 and is controlled by a normally closed diaphragm valve 160. A pilot line 313 leads off from ejector line 19 and has one branch 314 leading to valve 311 and controlled by normally closed solenoid valve 315; and a second branch 316 controlled by normally closed solenoid valve 317 and leading to diaphragm valves 160 and 318 in conduit 19, through branch 320.

The electrical system for this apparatus comprises power lines 180 and 181, normally open relay 183 with contact points 192 and 193, momentary contact switch 182 adapted to close a circuit through the relay coil through wire 195, all as described in connection with Fig. 5. In Fig. 6, contact point 192 is connected with a wire 322 which connects at a junction 323 with a wire 324 leading to float switch 307 and with a wire 325 leading to contact point 186 of a second normally closed relay 187. Point 186 is connected to a float switch 29 by wire 326. The float switch is also connected by a wire 327 with contact switch 182, as shown. The other side of float switch 307 leads through wire 328 to the coil of solenoid relay switch 187 and is connected at 329 by a wire 332 leading to the coil of solenoid valve 315. Solenoid valve 315 and the coil of relay 187 are also connected by a wire 330 and are connected to power line 181 at 331. Solenoid valve 317 is connected through wire 333 to junction 331 and to contact point 188 of relay 187 by a wire 334.

This system can best be understood by considering its operation.

During the softening operation manual valves 296 and 302 are open and valves 301, 305, 292, 304 and 306 are closed. The entire electrical control circuit is dead at this time so that solenoid valves 315 and 317 are closed and diaphragm valves 311, 318 and 160 are also closed. Water passes through conduits 13, 295 and 14 to the top of the tank and from the bottom of the tank through 290, 16 and 15 to service.

When time comes to regenerate, valves 296 and 302 are closed and valves 301 and 305 are opened. This institutes the backwashing step. Hard water flows through conduits 13, 16 and inlet 290 to the bottom of the softener and flows out through conduits 14 and 17 and backwash control 37.

After the softener is backwashed for a suitable length of time, valves 301 and 305 are closed and valves 292 and 306 are opened. At the same time momentary contact switch 182 is pressed, thereby energizing relay 183 and closing the contacts. Upon release of the switch relay 183 is held in closed position by reason of a circuit maintained through wires 181, 195, 327, float switch 29, wires 326 and 325 and back to wire 180 through points 192 and 193. Another circuit is maintained from wire 181, branching at 331 on the one hand through the solenoid of valve 315 and wire 332 and on the other hand through wire 330 and the coil of relay 187, rejoining at junction 329 to wire 328, switch 307, wires 324 and 322 and through contacts 192 and 193 back to power wire 180. The contacts of normally closed relay 187 are therefore opened and held opened and solenoid valve 315 is opened, admitting pressure to diaphragm valve 311 and opening it. Reclaimed brine flows by gravity through conduit 70, valve 311 and inlet conduit 63 to the softener. Spent brine runs from the softener through outlet 290 and drain pipe 291.

When the reclaiming tank is empty, float switch 307 opens, thereby interrupting the circuit through the coil of relay 187 and wires 324 and 328. Contacts 186 and 188 are closed. Float switch 307 also interrupts the circuit through solenoid valve 315 which is in parallel with the coil of relay 187. Pressure escapes from diaphragm valve 311 through a bleed 340, and the valve closes, closing conduit 70. A circuit is now established through wires 181, 333, solenoid valve 317, wire 334, contacts 188 and 186, wires 325 and 322 to power line 180. The self-sustaining circuit through relay 183 is maintained through wires 181 and 195, the coil of relay 183, wire 327, float switch 29, wires 326, 325, junction 323 and wire 322, and contacts 192 and 193 back to 180. Energization of solenoid valve 317 opens it and allows pressure to be admitted through pilot lines 316 and 320 to diaphragm valves 160 and 318. These open, and allow hard water to flow to the ejector 60 through 19 and strong brine to be drawn from the tank through conduit 312. The mixture of strong brine and water flows through conduit 63 to the softener, valve 311 being closed preventing any flow upwards into the recovery tank.

When the brine measuring tank is empty, float switch 29 opens, thereby interrupting the self-sustaining circuit through the coil of relay 183. This circuit before interruption was made through wire 180, 322, 325, 326, float switch 29, wire 327 and wire 195 to the other power line 181. The entire control circuit is now deenergized, whereupon solenoid valve 317 is deenergized and closes, allowing diaphragm valves 160 and 318 to close, stopping the injection of brine. Pressure in pilot line 320 is released by a bleed 341. Hard water inlet 19 is closed by valve 318, hence all flows through the apparatus are stopped. The U-bend 293 in drain conduit 291 prevents any draining of water from the softening tank.

The softener is now ready for rinsing. This can be done at the convenience of the operator. In order to give a signal when brine injection has been completed, a signaling device is provided. The signaling device may comprise a bell, lamp or the like. In Fig. 6 it is shown as comprising a bell 342 adapted to be energized by a power line 343, 344 which may be supplied by batteries or other convenient source of current. Float switch 29 is of the multiple contact type and is so arranged that when the contact connecting wires 326 and 327 are broken when the float reaches the bottom of the tank, a circuit is made through the bell. The bell rings only for a limited time since the brine measuring tank is gradually replenished with fresh brine from the salt storage tank. When the float rises to a certain extent the bell connection is broken. The signaling device can equally well be applied to the system shown in Fig. 5.

For rinsing, valves 292 and 306 are closed and valves 304 and 296 are opened. Hard water then flows through conduit 13, 295 and 14 to the top of the softener tank and effluent partially spent brine is forced up through reclaimed brine line 18 to the brine recovery tank. When the reclaiming tank is full, the excess of rinse water passes through the overflow to waste as in previously described modifications. When the rinsing is complete the operator closes valve 304 and opens valve 302, whereupon the softener is again in service.

It will be noted that the reclaiming system adds no valve operation steps to those that are necessary for manual regulation of the softener in the conventional reconditioning phases. The softener is as simple to operate as one not having the recovery system. Besides the brine recovery, there is the additional advantage that the operator does not have to oversee the brining operation, which is terminated automatically. Thus inadvertent waste of brine is obviated.

In softener installations embodying the apparatus of the present invention, the salt expenditure can be cut as much as 50 per cent.

What I claim is:—

1. In a regenerative water softener apparatus operated by valve means for the several regenerating steps including regenerating proper and rinsing, improved apparatus for recovering and reusing regenerating solutions comprising a reclaiming and measuring container adapted to receive a predetermined quantity of fluid a conduit leading from the softener through the valve means to said reclaiming container, electrically actuated means provided in the valve means for directing the rinsing flow from the softener through said conduit to the reclaiming container, said means being made operative upon shift of the valve means for the rinsing step, overflow means in the reclaiming container directing unreclaimed portions of the rinsing flow to waste, a conduit and connected means provided in the valve means directing flow of spent regenerating solution from the softener to waste, a conduit and electrically actuated means provided in the valve means directing flow of reclaimed solution from the container to the softener, said means being made operative upon shift of the valve means for the regenerating step, means adapted upon actuation thereof to direct the flow of fresh regenerating solution into the softener, means for actuating said last named means controlled by the fluid level in the reclaiming tank and switch means for energizing said electrically actuated means.

2. In a water softening apparatus having a container for zeolites and a source of fresh brine, conduits for flows of hard and soft water and regenerating solutions, valve means for controlling the different flows for a cycle of several regenerating operations including rinsing of brine from the zeolites and automatic control means for the valve means, improved automatic regenerating means wherein a portion of the brine used in regenerating is automatically reclaimed for reuse in a subsequent regenerating cycle, said means comprising a reclaiming container adapted to receive a portion of brine displaced from the zeolite container during rinsing, a conduit connecting the zeolite container through said valve means with the brine reclaiming container, means provided in said valve means and under control of the valve control means for directing said rinsing flow to displace brine from the zeolite container through said conduit to the reclaiming container said means being operative upon starting of said rinsing flow by the valve means, means also controlled by the valve control means for flowing reclaimed brine from the reclaiming container to the zeolite container and thence to waste when the softening apparatus is put in the brining phase by said valve means in a subsequent cycle, means adapted upon actuation to cause fresh brine to flow into the zeolite container from the source thereof and means for actuating said last named means controlled by the level of brine in the reclaiming container.

3. In water softening apparatus having a container for zeolites, conduits for flows of hard and soft water and regenerating solutions, a source of fresh brine and manually operable valve means for controlling the flows, improved automatic regenerating means wherein a portion of the brine used in regenerating is reclaimed for reuse in a subsequent regenerating cycle, said means comprising a reclaiming container adapted to receive a portion of brine displaced from the zeolite container during rinsing, a conduit connection between the zeolite container and the reclaiming container, means for diverting brine displaced from the zeolite container to the brine reclaiming container during the rinsing flow and electrically controlled means for causing reclaimed brine, in the brining phase of a subsequent cycle, to flow from the reclaiming container to the zeolite container and thence to waste, electrically controlled means adapted upon actuation to cause fresh brine to flow into the zeolite container from the source thereof, an electrical contro circuit for said electrically controlled means, the circuit being adapted for initial manual inauguration, the circuit including float switch means controlled by the level of brine in the reclaiming container and adapted to control the introduction of fresh brine to the zeolite container.

4. The apparatus of claim 1 wherein the reclaiming container is located above the zeolite container and reclaimed regenerating solution flows into the zeolite container by gravity, and in the means for flowing the reclaimed solution to the zeolite container is comprised a normally closed valve and means under control of said valve means for opening said valve at the beginning of the regenerating step to allow the reclaimed brine to flow into the zeolite container.

5. The apparatus of claim 2 wherein the means for causing reclaimed brine to flow into a zeolite container is a motorized pump controlled by said valve control means and adapted to be started at the beginning of the brining phase, the pump having an inlet connection to the reclaimed brine container and an outlet connection in communication with the zeolite container.

6. The apparatus of claim 3 wherein the reclaiming container is located above the zeolite container and the means for controlling flow of reclaimed brine to the zeolite container is an electrically operable valve in the conduit connection from the brine reclaiming tank to the zeolite container with means controlled by said electrical control circuit for opening said valve at the beginning of the brine phase so as to cause a flow of reclaimed brine to the container, the closing of said valve being controlled by said float switch on the brine reclaiming container.

7. The apparatus of claim 3 wherein the means for causing reclaimed brine to flow into the zeolite container is an electrically driven pump adapted to be started at the beginning of the brining phase, upon said initial manual circuit inauguration and to be stopped by said float switch in response to change of the brine level in the reclaiming container, the pump having an inlet connection to the reclaimed brine container and an outlet connection in communication with the zeolite container.

8. The apparatus of claim 1 wherein the means for causing reclaimed solution to flow into the softener comprises a conduit connection between the reclaiming container and the softener with hydraulically operated means in said conduit controlled by the valve means for causing flow of reclaimed solution at the beginning of the regenerating phase and the means for causing fresh regenerating solution to flow into the zeolite container comprises hydraulically operated means causing a flow of fresh solution at a succeeding stage in the regenerating cycle, and hydraulic means are provided for actuating said last named means under control by the liquid level in the reclaiming container.

9. In the apparatus of claim 3, a normally closed switch in the electrical control circuit, said switch being opened by the flow of a predetermined volume of fresh brine from the source thereof into the zeolite container, the controlling circuit being adapted to control the electrically controlled means for flowing the fresh brine, so that upon opening of said switch the flow of fresh brine is stopped and flow through the zeolite container is interrupted.

10. Improved automatic regenerating means for water softeners as set forth in claim 3, and provided with means for signalling the completion of the brining phase and the readiness of the softener for rinsing and brine reclamation, said signalling means comprising an electrical power circuit, switch means in said circuit arranged to be closed by flow of a predetermined volume of fresh brine from the source thereof into the zeolite container and electrical signal means energized by said circuit closing.

11. In a regenerative base exchange water softener, automatic brine recovery apparatus adapted for either manual or automatic softeners and comprising in combination a brine reclaiming and measuring tank, conduit and valve means directing the brine flow from the softener to waste, conduit and valve means directing the rinsing flow from the softener to the brine reclaiming tank, overflow means in said tank directing the last portions of the rinsing flow to waste, electrically actuated conducting means effective upon initiation of the brining step to direct flow from the brine reclaiming tank to the softener, electrically actuated means controlled by the liquid level in said tank to direct flow of fresh brine to the softener, and electrically connected switch means for energizing and deenergizing said two electrically actuated means.

HERBERT L. BOWERS.